(12) United States Patent
Raghunathan et al.

(10) Patent No.: US 11,971,863 B2
(45) Date of Patent: Apr. 30, 2024

(54) TECHNIQUES FOR USING AN IN-MEMORY ONLY FILE SYSTEM AS AN INTERFACE FOR MANAGING COMPUTER SYSTEMS AND USER SPACE FILE SYSTEMS

(71) Applicant: Oracle International Corporation, Redwood Shores, CA (US)

(72) Inventors: Parthasarathy Elangadu Raghunathan, Bangalore (IN); Shishir Mathur, San Mateo, CA (US); Shubha Bose, Foster City, CA (US); Aurosish Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 17/387,724

(22) Filed: Jul. 28, 2021

(65) Prior Publication Data
US 2022/0164322 A1 May 26, 2022

Related U.S. Application Data

(60) Provisional application No. 63/117,366, filed on Nov. 23, 2020.

(51) Int. Cl.
*G06F 16/00* (2019.01)
*G06F 9/455* (2018.01)
(Continued)

(52) U.S. Cl.
CPC ........ *G06F 16/196* (2019.01); *G06F 9/45558* (2013.01); *G06F 9/4881* (2013.01);
(Continued)

(58) Field of Classification Search
CPC .... G06F 16/18; G06F 9/45558; G06F 16/196; G06F 16/13; G06F 9/4881; G06F 16/122;
(Continued)

(56) References Cited

U.S. PATENT DOCUMENTS 5,596,745 A    1/1997   Lai
6,922,708 B1   7/2005   Sedlar
(Continued)

FOREIGN PATENT DOCUMENTS

CN          106815251 B     9/2019

OTHER PUBLICATIONS

Zhao, D., 'HyCache: A Hybrid User-Level File System with SSD Caching', Dept of Comp. Science, Illinois Inst. of Tech, Chicago, IL, http://datasys.cs.iit.edu/reports/2012_Qual-IIT_HyCache.pdf, 11pgs.
(Continued)

*Primary Examiner* — Yicun Wu
(74) *Attorney, Agent, or Firm* — Hickman Becker Bingham Ledesma LLP

(57) ABSTRACT

A manager file system (MFS), implemented using an OS process, exposes a path in the native file system as the root of its file system (e.g., mount point). The MFS informs the OS kernel that any file system operation whose path contains the mount point as its prefix, should be handed over to the process by invoking an appropriate interface method that the process implements as part of its file system implementation. The MFS manages one or more applications and leverages the authentication mechanism of the OS to provide fined-grained access control of MFS managed applications.

20 Claims, 6 Drawing Sheets

(51) Int. Cl.
  *G06F 9/48* (2006.01)
  *G06F 11/34* (2006.01)
  *G06F 16/11* (2019.01)
  *G06F 16/13* (2019.01)
  *G06F 16/188* (2019.01)

(52) U.S. Cl.
  CPC ........ *G06F 11/3409* (2013.01); *G06F 16/122* (2019.01); *G06F 16/13* (2019.01); *G06F 2009/45587* (2013.01); *G06F 2009/45595* (2013.01)

(58) Field of Classification Search
  CPC ....... G06F 11/3409; G06F 2009/45595; G06F 2009/45587; G06F 2201/815; G06F 11/1456; G06F 11/1469; G06F 11/1453; G06F 11/3485; G06F 2201/80; G06F 1/3221; G06F 3/0653; G06F 2206/1008; G06F 3/067; G06F 3/0625; G06F 11/00; G06F 3/0619; G06F 3/0689; G06F 3/0665; G06F 3/065; G06F 11/1448; G06F 11/3034; G06F 11/1451; G06F 2201/84; G06F 11/1461; G06F 16/27; G06F 16/214; G06F 2009/4557; G06F 2009/45562; G06F 9/547; G06F 3/061; G06F 11/2094; G06F 3/0643; G06F 16/93; G06F 11/1458; G06F 11/302; G06F 11/3006; G06F 11/3065; G06F 11/1464; G06F 16/90335; G06F 3/0641; G06F 11/1435; G06F 11/3433; G06F 3/0626; G06F 11/349
  See application file for complete search history.

(56) References Cited

U.S. PATENT DOCUMENTS

| | | | |
|---|---|---|---|
| 7,072,894 B2 | 7/2006 | Loy | |
| 7,418,439 B2 | 8/2008 | Wong | |
| 7,610,268 B2 | 10/2009 | Rossiter | |
| 7,672,981 B1 | 3/2010 | Faibish | |
| 8,239,486 B2 | 8/2012 | Susairaj | |
| 8,566,361 B2 | 10/2013 | Zha et al. | |
| 9,881,170 B2 | 1/2018 | Morris | |
| 10,817,382 B2 | 10/2020 | Sekar et al. | |
| 2003/0135511 A1 | 7/2003 | Anderson et al. | |
| 2007/0088706 A1 | 4/2007 | Goff | |
| 2008/0091743 A1 | 4/2008 | Goff | |
| 2011/0208911 A1 | 8/2011 | Taguchi et al. | |
| 2016/0110266 A1 | 4/2016 | Nara et al. | |
| 2016/0117337 A1 | 4/2016 | Aron | |
| 2018/0322136 A1 | 11/2018 | Carpentier | |
| 2019/0163405 A1* | 5/2019 | Israni | G06F 3/0659 |
| 2019/0369895 A1* | 12/2019 | Israni | G06F 3/0631 |
| 2021/0240583 A1* | 8/2021 | Upadhyay | G06F 11/1469 |
| 2022/0164320 A1 | 5/2022 | Raghunathan et al. | |
| 2022/0164321 A1 | 5/2022 | Raghunathan et al. | |

OTHER PUBLICATIONS

Stepanov, Konstantin, 'fusqlfs—Fuse file system to mount DB and provide tools to control and admin it', 2010, printed on Oct. 14, 2020 https://github.com/kstep/fusqlfs, 8pgs.

Rajgarhia, A., et al., 'Performance and Extension of User Space File Systems', SAC '10 Mar. 22-26, 2010, Sierre, Switzerland, https://core.ac.uk/download/pdf/193586624.pdf, 2010 ACM, 8pgs.

Pavlinusic, Dobrica, 'Fuse::DBI—mount your database as filesystem and use it', https://www.rot13.org/~dpaylin/fuse_dbi.html, updated Jan. 8, 2016. 9pgs.

'Makes a file system available for use', IBM Search in AIX 7.1 mount Command, Purpose, printed Oct. 14, 2020, https://www.ibm.com/docs/en/aix/7.1?topic=m-mount-command, 26pgs.

Kashyap, S., et al., 'Improving Database Performance With AIX Concurrent I/O', IBM corp 2003, https://pdfs.semanticscholar.org/9e86/832bc2639ee331f091b6lcbcc5f84847cc4f.pdf May 27, 2003, 13pgs.

'Atomic Commit in SQLite', prntd Oct. 12, 2020, https://sqlite.org/atomiccommit.html#section_3_, 25pgs.

'Dimensions CM, UNIX Installation Guide', 2019 Micro Foscus, https://admhelp.microfocus.com/dimensionscm/en/14.5.1/dmcm_unix_installation_guide.pdf, updtd Dec. 9, 2019; 188pgs.

Di Pierro, Massimo, 'WEB2PY Complete Reference Manual, 5th Edition', downloaded from http://web2py.com/books/default/chapter/29/13/deployment-recipes?search=Daemon, build date Mar. 3, 2013, 614pgs.

* cited by examiner

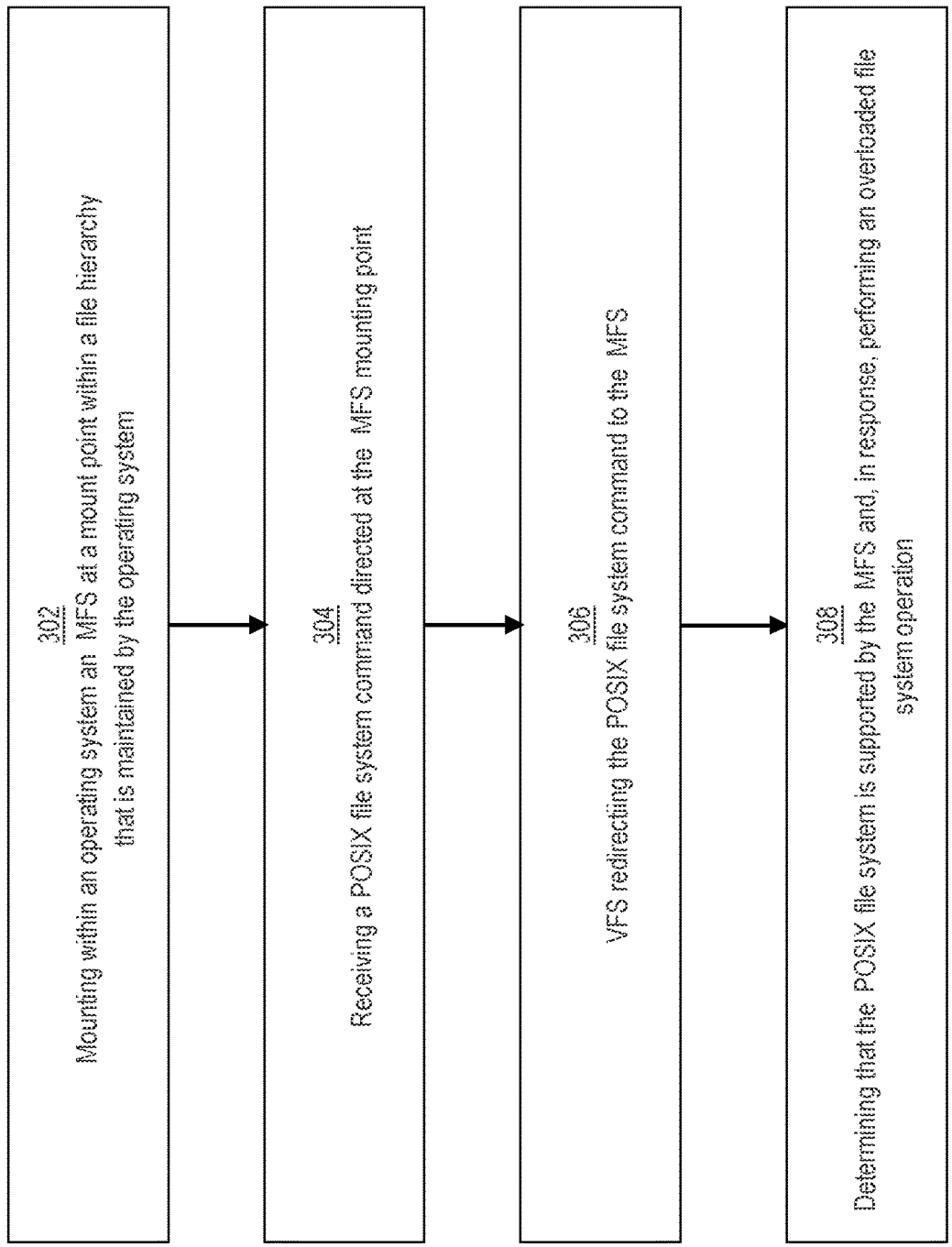

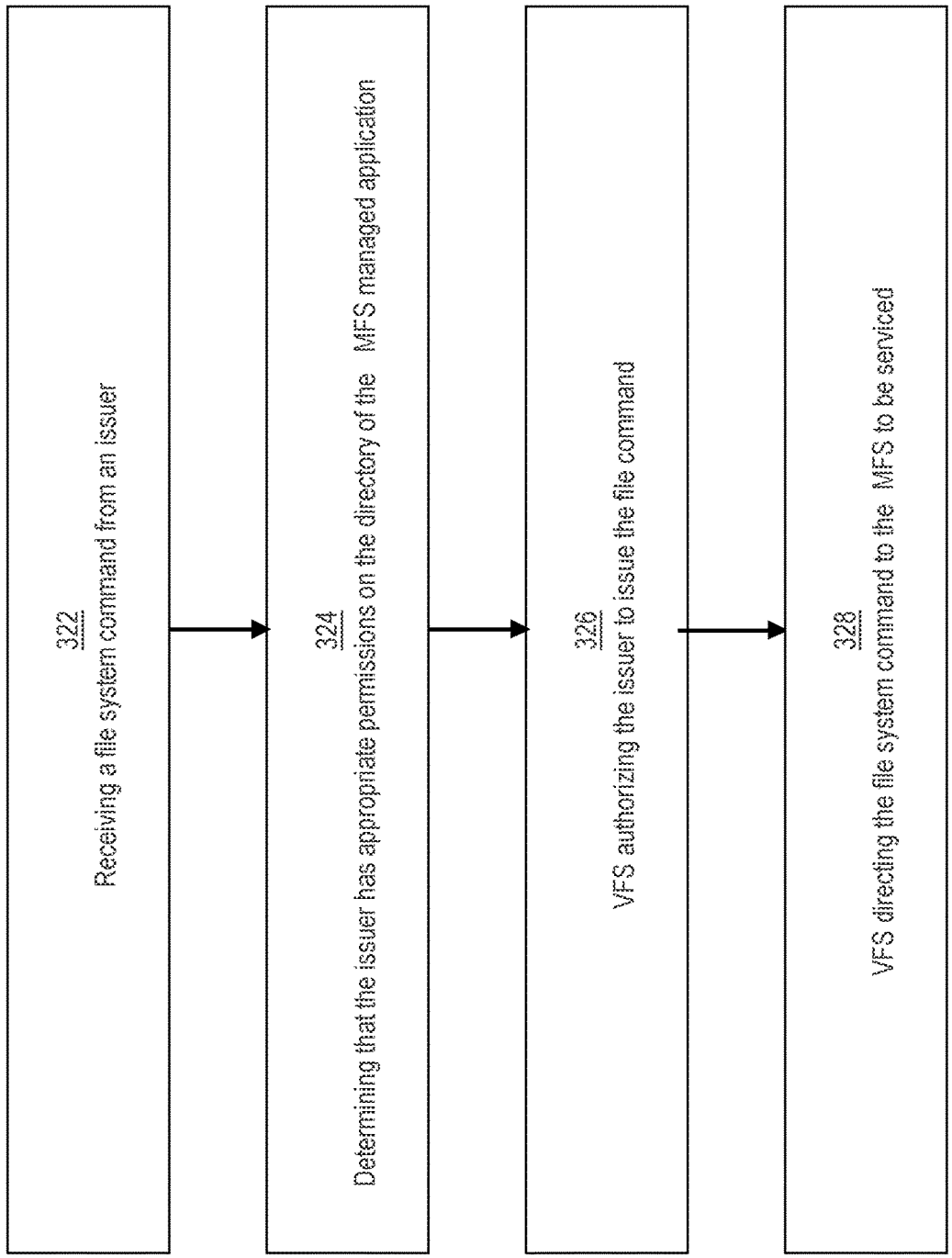

TECHNIQUES FOR USING AN IN-MEMORY ONLY FILE SYSTEM AS AN INTERFACE FOR MANAGING COMPUTER SYSTEMS AND USER SPACE FILE SYSTEMS

BENEFIT CLAIM

This application claims the benefit under 35 U.S.C. § 119(e) of provisional application 63/117,366, filed Nov. 23, 2020, the entire contents of which is hereby incorporated by reference for all purposes as if fully set forth herein.

FIELD OF THE INVENTION

The present invention relates to providing security and access control to computer systems and user space file systems via an in-memory file system as a controlling entity.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A communication interface between a controlling entity (e.g., operating system process) and a managed entity (e.g., operating system user or another process) may be through sockets (TCP/UDP), named pipes, shared memory, or a command line interface provided by the process (such as a shell). These solutions, though widely used, can pose problems in typical implementations, particularly in the areas of security and fine grained access control.

For example, opening up ports for sockets may pose security issues. Shared memory has synchronization problems. Command line interface (CLI) requires a sufficient implementation of command parser. Furthermore, another problem with these existing solutions is that they lack fine grained controls on who can send what commands. There is no method that allows a set of OS users to issue certain commands, such as "create user" and "delete user," while allowing another set of OS users to issue other commands, such as "list users."

Therefore, there is a need for a controlling entity to manage and to provide security and access control to different computer system entities such as processes, configurations, and other user space file systems.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 3A illustrates a flow diagram that depicts an MFS-directed file system command processing method.

FIG. 3B illustrates a flow diagram that depicts an authorization method.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A manager file system (MFS) runs as a user space file system. Commands mimicked as file system commands may be directed to the mount point of the MFS. However, the MFS does not respond to them as file system commands but, instead, responds by performing operations to manage any number of applications. These commands are referred to herein as overloaded commands. The application managed by an MFS are referred to herein as MFS managed applications. As indicated, overloaded commands are used to manage managed applications.

The MFS may be referred to herein as a pseudo-file system because users and applications interact with the MFS to a degree as if it were a file system mounted at a mount point. Also, an MFS includes a controlling process that has been registered with a virtual file system (VFS) to handle commands directed to the mount point. However, the MFS manages no file under the mount point but is instead used to manage MFS managed applications, such as user space file systems mounted at other mount points. Examples of a user space file system include a DBFS and an object store (e.g., Amazon S3).

According to an embodiment, any file system operation on a path with the MFS mount point as a prefix is redirected to the controlling process of the MFS by the VFS. This ensures that every file system operation is associated with an OS user's credentials, which are already authenticated by the operating system (OS), prior to being serviced by the MFS. This can be used for authorization of communication with the MFS (and similarly with MFS managed applications).

According to an embodiment, file system operations may be overloaded with an implementation of control instructions. For example, a standard file system interpretation of the set fat t r file system command is to associate a new value with an extended attribute name for each specified file. However, the command may be overloaded and interpreted by the MFS to mount or unmount an MFS managed application. File system commands redirected to the MFS that are supported by the MFS are serviced accordingly to manage MFS managed applications. File system commands redirected to the MFS that are not supported by MFS may result in an error.

Database File System Architecture

Figure 1:
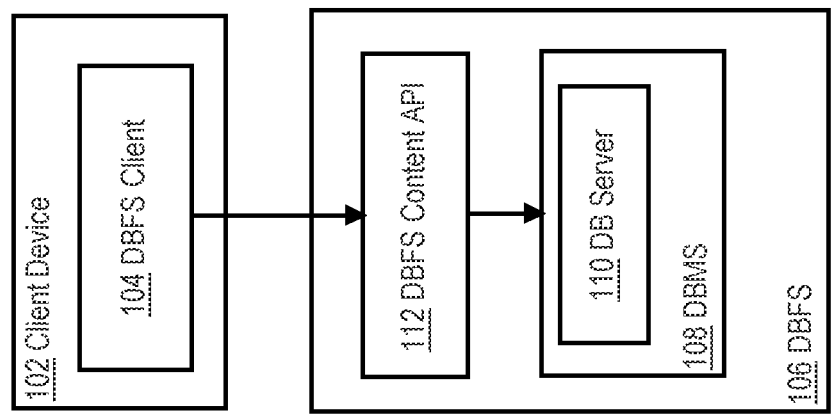
FIG. 1 is a block diagram that depicts an example network arrangement for a DBFS.

FIG. 1 is a block diagram that depicts an example network arrangement 100 for a database file system. A database file system (DBFS) 106 leverages database system's ability to store files and to efficiently manage relational data. The DBFS 106 provides a client-server file system abstraction over files stored in a database allowing users to perform network file system operations within the database using standard file system interfaces instead of standard database interfaces. The DBFS 106 provides a transparent abstraction layer of a shared network file system as a local file system to a client.

A client device 102 is communicatively coupled with a database management system (DBMS) 108. The client device 102 may be implemented by any type of computing device.

The DBMS 108 manages a database and may include one or more database servers 110. The client device 102 interacts with the database server 110 of the DBMS 108 by submitting to the database server 110 commands that cause the database server 110 to perform operations on data stored in the database.

The DBMS 108 is in effect the file system server for the DBFS 106. The file system server includes one or more file system stores that are accessed by a set of interfaces called DBFS Content API 112. A file system store is characterized by one or more database objects including, but not limited to, tables, table partitions, and indexes. The DBFS Content API 112 provides database interfaces that correspond to a set file system access primitives. For example, a file system command may be to retrieve data, which may correspond to a database command to retrieve data from tables.

The client device 102 may be configured with a DBFS client 104. The DBFS client 104 may be implemented in any number of ways, including as a stand-alone application running on the client device 102. The DBFS client 104 may be implemented by one or more logical modules. The client device 102 may be configured with other mechanisms, processes, and functionalities, depending upon a particular implementation to interact with the DBFS client 104.

Embodiments of the DBFS client 104 may use different mechanisms including but not limited to FUSE to expose file system calls from the operating system kernel as function callbacks in user space. The DBFS client 104 then transforms the function callbacks to the equivalent database interfaces provided by the DBFS Content API 112 and sends the database call to the DBMS 108. Client-user file system requests that are related to the files within the DBFS file system are then converted into database operations. The DBFS file system is mounted on a client machine at a mount point as described below. File system operation requests from a mount user directed to the mount point are translated by the DBFS client 104 to their corresponding database operation requests and sent to the DBMS 108.

An example DBFS architecture is described in U.S. Pat. No. 6,922,708, titled "File System that Supports Transactions," issued on Jul. 26, 2005, by Eric Sedlar, the entire contents of which is hereby incorporated by reference for all purposes as if fully set forth herein.

File System Userspace (Fuse)

FUSE is a module in a Unix and Unix-like computer operating system (OS), such as Linux, that allows a user-space process to register itself with the OS as a service provider for a user-defined file system. Once the user-defined file system is mounted, the FUSE kernel module registers the file system with the VFS. Registration of the user-defined file system involves providing an implementation to a pre-defined file system interface (e.g., read( ) write( ) mkdir( ) etc.) by invoking an appropriate system call that is available as part of FUSE.

The user-space process exposes a path in the native file system as the root of its file system (mount point). It informs the OS kernel that any file system operation whose path contains the mount point as its prefix (e.g., file system calls issued to the mount point), should be handed over or forwarded to this process, through the VFS, by invoking the appropriate interface method that this process implements as part of its file system implementation.

Manager File System (MFS)

Figure 2:
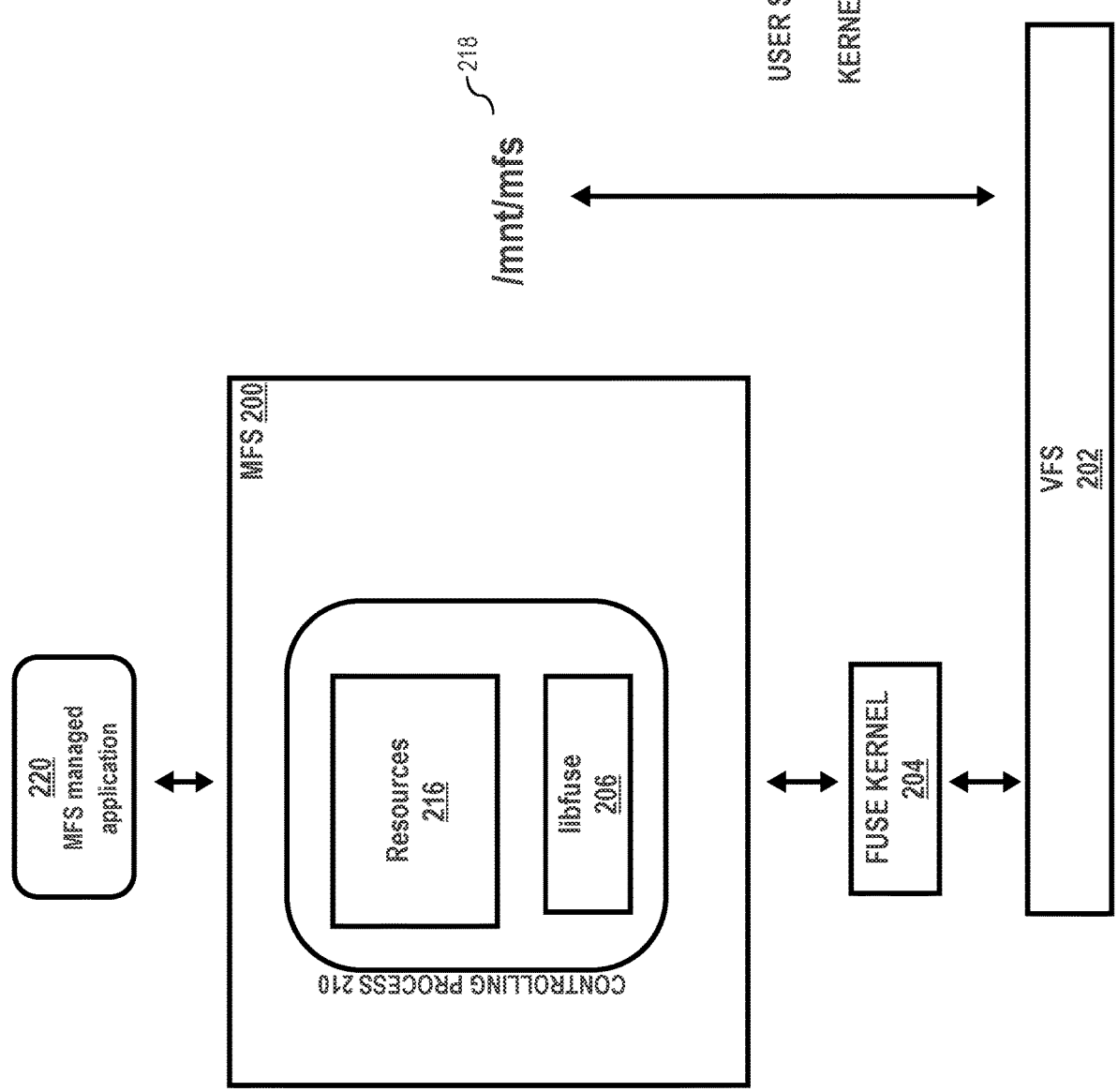
FIG. 2 illustrates a block diagram of an MFS.

As mentioned before, an MFS, which exists in user space of an OS, can be used to manage and provide security and access controls to MFS managed applications, such as processes, configurations, and user space file systems. An MFS is an in-memory pseudo file system which utilizes a file system interface to which commands may be directed to control and configure one or more MFS managed applications. FIG. 2 illustrates MFS 200.

Referring to FIG. 2, the MFS 200 represents an MFS implementation according to an embodiment. The MFS 200 is implemented using a controlling process 210. The controlling process 210 registers itself with FUSE kernel module 204, as the file system service provider of a specified mount point, which is MFS mount point 218 (i.e., /mnt/mfs).

In an embodiment, the MFS 200 is instantiated by specifying the "mfs mount" command line option as follows dbfs_client –o mfs_mount=/mnt/mfs, where "/mnt/mfs" is the MFS mount point 218. The MFS 200 exposes the MFS mount point 218 (i.e., /mnt/mfs) to in effect act as a communication endpoint to the controlling process 210. Any command issued on a path that has the MFS mount point 218 (i.e., /mnt/mfs) as a prefix is redirected by VFS 202 to the controlling process 210 as the MFS 200 is the handler of these commands. The redirection to the controlling process 210 is through the FUSE kernel module 204 and libfuse 206, which bridges the FUSE kernel module 204 with the controlling process 210. The controlling process 210 services the command accordingly. Resources 216 are computer resources, such as threads and a connection pool, that are dedicated to the MFS 200 for servicing commands.

As further discussed below, commands directed to the MFS mount point 218 (i.e., /mnt/mfs) may be mimicked as file system commands. However, the MFS 200 does not respond to them as file system commands but, instead, responds by performing operations to manage one or more user space file systems 220. Each MFS managed application managed by the MFS 200 appears as a pseudo file or directory under the control of the MFS 200.

An example MFS managed application is a DBFS. As explained earlier, a DBFS comprises a DBFS client connected to a DBMS to store and provide file data. The client device and the DBMS may be on separate computers connected via a network. With respect to the DBFS 220, the controlling process 210 is a DBFS client analogous to the DBFS client 104.

Overloaded Commands

Registration of the controlling process 210 with the FUSE kernel module 204 includes defining an implementation to one or more of a plurality of pre-defined file system operations that is available as part of FUSE. In an embodiment, a function handler is defined for each file system operation, overloading a standard file system operation (e.g., POSIX file system operation) with an implementation of custom control instructions.

For example, a standard file system interpretation of the setfattr file system command is to associate a new value with an extended attribute name for each specified file. However, the command may be overloaded and interpreted by the MFS 200 to mount or unmount a user space file system 220. As an illustration, the overloaded file system command setfattr-n mount-v "inst1 /mnt/mp" /mnt/mfs, as interpreted by the MFS 200, sets the extended attribute "mount" on a database system pointed to by "inst1." Connection information, such as server name, port and system identifier, for connecting with "inst1" may be provided in a configuration file and retrieved therefrom to establish a connection to a DBMS, which manages the database that stores file data and file metadata for the DBFS. The DBFS is mounted at the mount point "/mnt/mp" as specified in the command line.

The mount point of the DBFS (i.e., /mnt/mp) is where the DBFS is accessible for a mount user. A mount user is any OS user or any process that has access to the DBFS mount point (i.e., /mnt/mp), which is a pseudo directory under the control of the MFS. The mount user can operate on the DBFS mount point (i.e., /mnt/mp) as any directory in the OS and can perform any file system operations (e.g., create/read/update/delete file, create/remove directories, etc.) that the mount user has permission to perform.

In an embodiment, the overloaded setfattr file system command with options may be interpreted by the MFS 200 to dynamically adjust resources of each mount point for any DBFS managed by the MFS 200. For example, the overloaded command with options may be interpreted by the MFS 200 to reduce the connections in the database connection pool of resources of a DBFS managed by the MFS 200. A database connection pool is a cache of database connections that is maintained so that the connections can be reused to connect to a DBMS to access files and file metadata stored in the DBMS.

Another file system command that may be overloaded is the getattr file system command. The standard file system interpretation of the getattr file system command is to return a value of a named attribute of an object. However, this command may be overloaded and interpreted by the MFS 200 to return the number of DBMSs currently managed by the MFS 200.

Another file system command that may be overloaded is the read file system command. The standard file system interpretation of the read file system command is to read data from an opened file. However, this command may be overloaded and interpreted by the MFS 200 to return details of any DBFS managed by the MFS 200.

File system commands directed to the MFS mount point 218 (i.e., /mnt/mfs) that are supported (e.g., can be interpreted as overloaded commands) by the MFS 200 are serviced accordingly to manage (e.g., control, configure) MFS managed applications 220. File system commands directed to the MFS mount point 218 (i.e., /mnt/mfs) that are not supported by MFS 200 may result in an error.

Management of concurrent access to DBMSs is described in U.S. patent application Ser. No. 17/387,718, titled "A Scalable Framework for Managing Concurrent Accesses to Database File Systems," filed Jul. 28, 2021, and U.S. patent application Ser. No. 17/387,708, titled "Autonomous Deployment of Multiple Database File Systems," filed Jul. 28, 2021, the entire contents of which are hereby incorporated by reference for all purposes as if fully set forth herein.

Example MFS Method of Handling Commands

FIG. 3A illustrates a flow diagram 300 that depicts an MFS-directed file system command processing method. At step 302, MFS 200 is mounted within an operating system at mount point 218 (i.e., /mnt/mfs) within a file hierarchy that is maintained by the operating system. The MFS 200 is an in-memory only pseudo file system. The MFS 200 is implemented using controlling process 210. The MFS mount point 218 acts as a communication endpoint to the controlling process 210.

During the mounting of the MFS 200, a plurality of function handlers for handling a plurality of POSIX file system commands for which POSIX defines POSIX file system operations, is defined. For example, a POSIX file system command is setfattr for which its POSIX file system operation is to associate a new value with an extended attribute name for each specified file. A function handler is defined for setfattr in which the function handler performs an overloaded operation that is different from the POSIX file system operation. The overloaded operation may be creating a DBFS mount point, for example. The function handler is executed by the MFS 200 without performing the respective POSIX file system operation.

At step 304, the operating system receives a POSIX file system command directed at the MFS mounting point.

At step 306, in response to the operating system receiving the POSIX file system command, VFS 202 redirects the POSIX file system command to the MFS 200.

At step 308, the POSIX file system command is determined to be supported by the MFS 200 and, in response, the MFS 200 executes a function handler associated with the POSIX file system command to perform an overloaded file system operation that is different than a respective POSIX file system operation of the POSIX file system command. For example, the POSIX file system command may be the file system command setfattr-n mount-v "inst1 /mnt/mp" /mnt/mfs, which is interpreted by the MFS 200 to mount a database system pointed to by "inst1" at the mount point "/mnt/mp".

In an embodiment, any POSIX file system commands redirected to the MFS 200 that are not supported by the MFS 200 will result in an error.

User Permissions

As discussed above, the MFS 200 exposes the MFS mount point 218 (i.e., /mnt/mfs) that acts as a communication endpoint to the controlling process 210. Any command on a path with the MFS mount point 218 (i.e., /mnt/mfs) as a prefix is redirected by VFS 202 to the controlling process 210. This redirection by the VFS 202 ensures that every command is associated with an OS user's credentials, which are already authenticated by the OS.

One mechanism used by a file system to control access to data is an access control list (ACL). An ACL is a list of permissions that are associated with the file system. It stores a series of entries that identify specific users or groups and their access privileges for a resource, such as a directory or a file. The types of access include read (r), write (w), and execute (x). A file may have its own ACL or may share an ACL with other files. An example of changing these permissions to change permission to only allow an owner user to have full access pseudo directory but limit others to reading only would be chmod 744/mnt/mp. ACLs have the advantage of specifying detailed access permissions for multiple users or groups.

Leveraging the authentication feature of Unix or Unix-like computer OSs, user permissions can be set on pseudo directories and pseudo files exposed through the MFS 200 such that user permissions can be used to control who can issue what commands through the MFS 200. This ensures secure access to MFS managed applications (e.g., DBFSs)

through the controlling process 210. The VFS 202 enforces the permissions and only authorizes the appropriate OS users to set extended attributes on the pseudo directories and the pseudo files. A command when executed by an OS user who does not have the correct permissions on a directory or file will receive an error.

For example, an overloaded command setfattr-n create-v may be interpreted by the MFS 200 to create and delete users. Assume that the overloaded command is performed on a pseudo directory "userManage" exposed by the MFS 200 and that the rwx (read, write, execute) permissions for a user/group on the "userManage" pseudo directory had been previously set by the controlling process 210 using standard OS ACL controls. When the overloaded command % setfattr-n create-v "user 1 group 1 password" /mnt/mfs/userManage, which may be interpreted by the MFS 200 to create a user "user 1" and assign it to the group "group1" and set the password to "password," is received from an OS user, the command is transmitted to the VFS 202. The VFS 202 automatically enforces the permissions and only authorizes the appropriate OS users to issue this command on the "userManage" directory. If this command is executed by an OS user who does not have write permission on the "userManage" directory, then the OS user will receive an error.

Example Authorization Method

FIG. 3B illustrates a flow diagram 320 that depicts an authorization method. At step 322, a file system command is received from an issuer (e.g., mount user). The file system command is directed to a mount point of MFS managed application 220. The MFS managed application 220 is managed by MFS 200, which is implemented using a controlling process 210 in user space. The issuer can operate on the mount point of the MFS managed application as any directory in the OS and can perform any file system operations (e.g., create/read/update/delete file, create/remove directories, etc.) that the issuer has permission to perform.

At step 324, the issuer is determined to have appropriate permissions on the directory of the MFS managed application 220 to issue the file system command on the directory of the MFS managed application 220. The directory of the MFS managed application 220 had been previously set by the controlling process 210 using standard OS ACL controls. The VFS 202 enforces permissions and only authorizes appropriate issuers to issue file system commands on pseudo directories and pseudo files.

At step 326, in response to determining that the issuer has the appropriate permissions, the VFS 202 authorizes the issuer to issue the file command.

In an embodiment, an error is returned if it is determined that the issuer does not have appropriate permissions at step 324.

At step 328, the VFS 202 directs the file system command to the MFS 200 to be serviced.

Techniques described herein provide the ability to provide fine grain access control by leveraging the authentication mechanism of the OS and the file system permission enforcement of the kernel. User permissions are set on pseudo directories and files exposed through MFS so that user permissions are used to control who can issue what commands through the MFS. This ensures secure access to the MFS managed applications through the controlling process.

DBMS Overview

Embodiments of the present invention are used in the context of DBMSs. Therefore, a description of a DBMS is useful.

A DBMS 108 manages a database. The DBMS 108 may comprise one or more database servers 110. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server 110 of a DBMS 108 by submitting to the database server 110 commands that cause the database server to perform operations on data stored in a database. A user may be one or more applications running on a client computer that interact with a database server 110. Multiple users may also be referred to herein collectively as a user.

A database command may be in the form of a database statement that conforms to a database language. A database language for expressing the database commands is SQL. There are many different versions of SQL, some versions are standard and some proprietary, and there are a variety of extensions. DDL commands are issued to a database server 110 to create or configure database objects, such as tables, views, or complex data types. SQL/XML is a common extension of SQL used when manipulating XML data in an object-relational database. PL/SQL is another extension of SQL for querying and updating data in a relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server 110. A server, such as a database server 110, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects. For example, in response to receiving a DDL statement to create table person, a database server alters metadata in a database dictionary to define table and its columns. A database dictionary is referred to by a DBMS 108 to determine how to execute database commands submitted to a DBMS 108. Thus, when a DML statement is received by a database server 110 to insert rows with a value in a sparse column, the database server 110 consults the database dictionary to determine that the column is sparse and stores that values.

A DBMS 108 receives queries issued against a database object managed by a database system. A query optimizer associated with the database system may generate one or more different candidate execution plans for a query, which are evaluated by the query optimizer to determine which execution plan should be used to compute the query.

Hardware Overview

Figure 4:
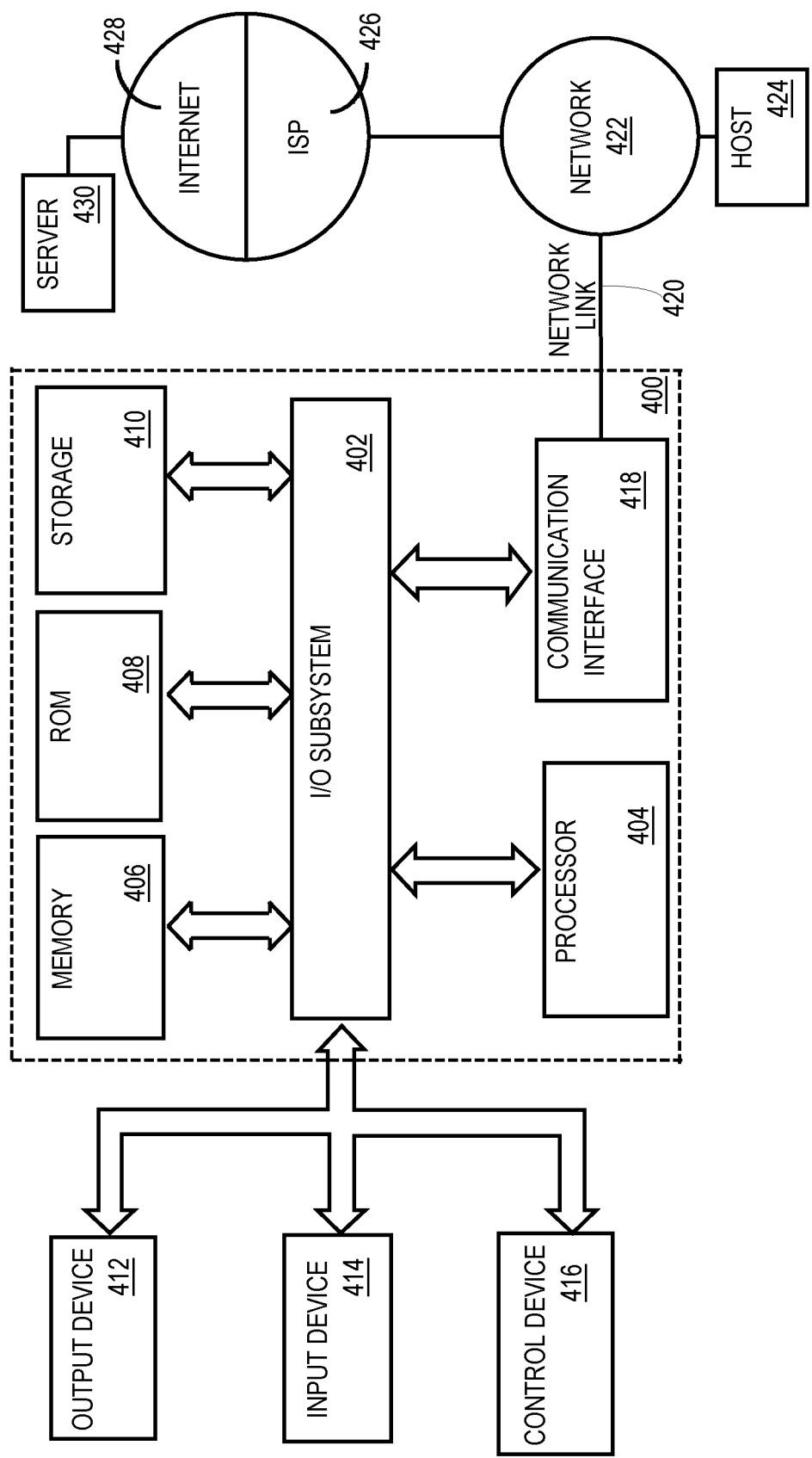
FIG. 4 illustrates a block diagram of a computing device in which the example embodiment(s) of the present invention may be embodiment.

Referring now to FIG. 4, it is a block diagram that illustrates a basic computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or another processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the worldwide packet data communication network now commonly referred to as the "Internet" 428. Local network(s) 422 and Internet 428 use electrical, electromagnetic, or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Software Overview

Figure 5:
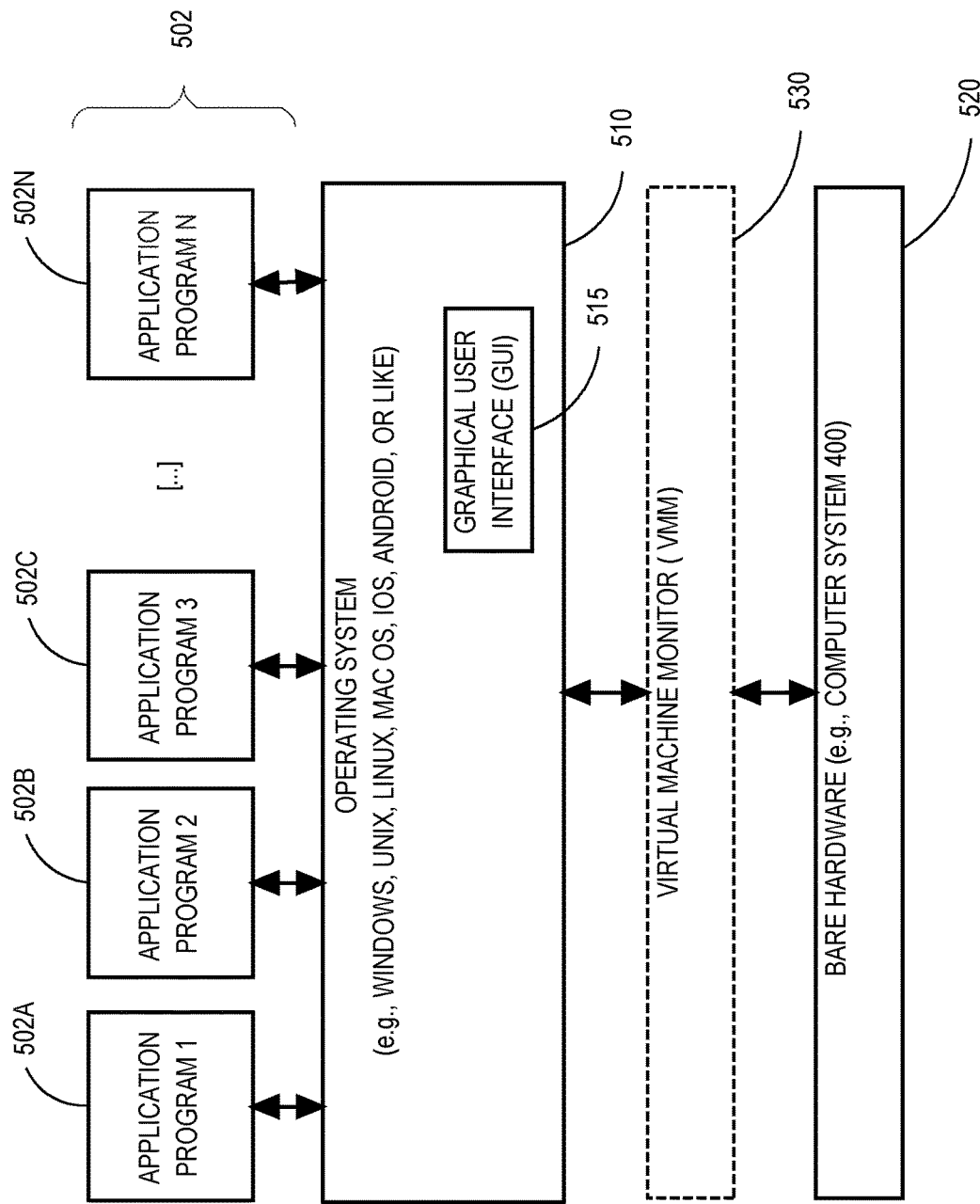
FIG. 5 illustrates a block diagram of a basic software system for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The MINIM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   mounting within an operating system a user space file system at a mount point within a file hierarchy that is maintained by the operating system, wherein the mounting includes:
   specifying a plurality of function handlers for handling a plurality of POSIX file system commands for which POSIX defines POSIX file system operations;
   starting a controlling process that executes within a user space of the operating system to execute one or more the plurality of function handlers;
   the operating system receiving a first POSIX file system command directed at the mounting point; and
   in response to the operating system receiving the first POSIX file system command, the user space handler executing a function handler associated with the first POSIX file system command to perform an overloaded file system operation that is different than a respective POSIX file system operation of the first POSIX file system command.

2. The method of claim 1, wherein mounting within the operating system the user space file system at the mount point further comprises registering the user-space handler with a virtual file system of the operating system.

3. The method of claim 1, wherein the function handler associated with the first POSIX file system command is executed by the user space handler without performing the respective POSIX file system operation.

4. The method of claim 1, wherein the user space handler manages a plurality of database file systems.

5. The method of claim 1, wherein pseudo directories exposed through the user space file system are configured with user permissions.

6. The method of claim 5, wherein the pseudo directories exposed through the user space file system are configured using an authentication mechanism of the operating system.

7. The method of claim 5, wherein the pseudo directories exposed through the user space file system are configured by the controlling process.

8. The method of claim 1, further comprising determining that an issuer of the first POSIX file system command has appropriate permissions on a pseudo directory or pseudo file identified by the first POSIX file system command, wherein the function handler associated with the first POSIX file system command is executed in response to determining that the issuer of the first POSIX file system command has appropriate permissions on the pseudo directory or pseudo file identified by the first POSIX file system command.

9. The method of claim 1, further comprising:
   the operating system receiving a second POSIX file system command directed at the mounting point, wherein the second POSIX file system command does not correspond with any of the plurality of function handlers;
   in response to the operating system receiving the second POSIX file system command, returning an error.

10. The method of claim 1, further comprising:
    the operating system receiving a subsequent POSIX file system command directed at the mounting point, wherein the subsequent POSIX file system command corresponds with one of the plurality of function handlers;
    determining that an issuer of the subsequent POSIX file system command does not have appropriate permissions on a pseudo directory or pseudo file identified by the subsequent POSIX file system command;
    in response to determining that the issuer of the subsequent POSIX file system command does not have appropriate permissions on the pseudo directory or pseudo file identified by the subsequent POSIX file system command, returning on error.

11. One or more non-transitory computer-readable storage media storing one or more sequences of program instructions which, when executed by one or more computing devices, cause:
    mounting within an operating system a user space file system at a mount point within a file hierarchy that is maintained by the operating system, wherein the mounting includes:
    specifying a plurality of function handlers for handling a plurality of POSIX file system commands for which POSIX defines POSIX file system operations;
    starting controlling process that executes within a user space of the operating system to execute one or more the plurality of function handlers;
    the operating system receiving a first POSIX file system command directed at the mounting point; and
    in response to the operating system receiving the first POSIX file system command, the user space handler executing a function handler associated with the first POSIX file system command to perform an overloaded file system operation that is different than a respective POSIX file system operation of the first POSIX file system command.

12. The one or more non-transitory computer-readable storage media of claim 11, wherein mounting within the operating system the user space file system at the mount point further comprises registering the user-space handler with a virtual file system of the operating system.

13. The one or more non-transitory computer-readable storage media of claim 11, wherein the function handler associated with the first POSIX file system command is executed by the user space handler without performing the respective POSIX file system operation.

14. The one or more non-transitory computer-readable storage media of claim 11, wherein the user space handler manages a plurality of database file systems.

15. The one or more non-transitory computer-readable storage media of claim 11, wherein pseudo directories exposed through the user space file system are configured with user permissions.

16. The one or more non-transitory computer-readable storage media of claim 15, wherein the pseudo directories exposed through the user space file system are configured using an authentication mechanism of the operating system.

17. The one or more non-transitory computer-readable storage media of claim 15, wherein the pseudo directories exposed through the user space file system are configured by the controlling process.

18. The one or more non-transitory computer-readable storage media of claim 11, wherein the one or more sequences of program instructions which, when executed by the one or more computing devices, further cause determining that an issuer of the first POSIX file system command has appropriate permissions on a pseudo directory or pseudo file identified by the first POSIX file system command, wherein the function handler is executed in response to determining that the issuer of the first POSIX file system command has appropriate permissions on the pseudo directory or pseudo file identified by the first POSIX file system command.

19. The one or more non-transitory computer-readable storage media of claim 11, wherein the one or more sequences of program instructions which, when executed by the one or more computing devices, further cause:
the operating system receiving a second POSIX file system command directed at the mounting point, wherein the second POSIX file system command does not correspond with any of the plurality of function handlers;
in response to the operating system receiving the second POSIX file system command, returning an error.

20. The one or more non-transitory computer-readable storage media of claim 11, wherein the one or more sequences of program instructions which, when executed by the one or more computing devices, further cause:
the operating system receiving a subsequent POSIX file system command directed at the mounting point, wherein the subsequent POSIX file system command corresponds with one of the plurality of function handlers;
determining that an issuer of the subsequent POSIX file system command does not have appropriate permissions on a pseudo directory or pseudo file identified by the subsequent POSIX file system command;
in response to determining that the issuer of the subsequent POSIX file system command does not have appropriate permissions on the pseudo directory or pseudo file identified by the subsequent POSIX file system command, returning on error.

* * * * *

UNITED STATES PATENT AND TRADEMARK OFFICE
CERTIFICATE OF CORRECTION

PATENT NO. : 11,971,863 B2
APPLICATION NO. : 17/387724
DATED : April 30, 2024
INVENTOR(S) : Raghunathan et al.

It is certified that error appears in the above-identified patent and that said Letters Patent is hereby corrected as shown below:

On the Title Page

On page 2, Column 2, item (56) under Other Publications, Line 8, delete ""~dpaylin" and insert -- ~dpavlin --, therefor.

On page 2, Column 2, item (56) under Other Publications, Line 15, delete "9e86/832bc2639ee331f091b6lcbcc5f84847cc4f.pdf" and insert -- 9e86/832bc2639ee331f091b61cbcc5f84847cc4f.pdf --, therefor.

On page 2, Column 2, item (56) under Other Publications, Line 19, delete "Foscus," and insert -- Focus, --, therefor.

On page 2, Column 2, item (56) under Other Publications, Line 20, delete "1/dmcm_" and insert -- 1/PDF/dmcm_ --, therefor.

In the Specification

In Column 1, Line 60, delete "MFS;" and insert -- MFS. --, therefor.

In Column 2, Line 18, delete "#section_3_," and insert -- #section_3_6, --, therefor.

In Column 2, Line 49, delete "set fat t r" and insert -- setfattr --, therefor.

In Column 3, Lines 62-63, delete "read( ) write( ) mkdir( )" and insert -- read( ), write( ), mkdir( ), --, therefor.

In Column 4, Line 24, delete ""mfs mount"" and insert -- "mfs_mount" --, therefor.

In Column 4, Line 62, delete "PO SIX" and insert -- POSIX --, therefor.

Signed and Sealed this
Fifteenth Day of October, 2024

Katherine Kelly Vidal
*Director of the United States Patent and Trademark Office*

In Column 10, Line 17, delete "(on/oft)" and insert -- (on/off) --, therefor.

In Column 12, Line 47, delete "MINIM" and insert -- VMM --, therefor.

In the Claims

In Column 14, Line 59, in Claim 11, delete "starting" and insert -- starting a --, therefor.